United States Patent Office 3,254,070
Patented May 31, 1966

3,254,070
PROCESS FOR THE PRODUCTION OF HIGH MOLECULAR WEIGHT ETHYLENE POLYMERS
Otto Roelen, Oberhausen-Holten, Germany, assignor to Ruhrchemie Aktiengesellschaft, Oberhausen-Holten, Germany, a corporation of Germany
Filed June 20, 1955, Ser. No. 516,745
Claims priority, application Germany, June 25, 1954, R 14,501
11 Claims. (Cl. 260—94.9)

For the production of high molecular products having molecular weights in excess of 100,000, ethylene was hitherto treated in the presence of suitable polymerization stimulants at gas pressures ranging below 200 kg./sq. cm. and temperatures up to about 100° C. in liquid phase. The polymerization stimulants and the reaction products are dissolved or suspended in inert auxiliary liquids, such as saturated hydrocarbons of the diesel oil boiling range, with the auxiliary liquid serving as diluting agent for the products formed in the reaction. The auxiliary liquid is capable of readily removing the considerable heat of reaction of the polymerization process, or of transfering the same to cooling surfaces, thereby avoiding harmful increases in temperature. However, the use of auxiliary liquids has several disadvantages originating from the handling, separation, recovery and regeneration of the liquid.

It has now been found that high molecular ethylene polymers having molecular weights in excess of 100,000 may be produced from ethylene or ethylene-containing gases by means of polymerization stimulants and at gas pressures of below 200 kg./sq. cm., if the polymerization of the ethylene is effected at temperatures ranging below the caking or sintering temperature of the polymerized products within a mixture consisting of solid or liquid polymerization stimulants and reaction products, which is in powder form or in granular state and is continuously mechanically subdivided and/or agitated in such a manner that all parts of the mixture react with the ethylene constantly and with as little obstruction as possible.

This mode of operation is possible because it has quite unexpectedly been found that if the polymerization is effected in the manner according to the invention the products separate in the pulverulent or granular form and can be retained in this state for the duration of the further conversion. Consequently, it is possible to continuously subdivide and/or agitate mechanically the pulverulent or granular mixture in such a manner as to achieve sufficient contact between the gas and the stimulant. At the same time, I avoid the development of zones of local overheating, which may result from accumulation of the heat of reaction. In this manner the polymerization process may be effected with the use of suitable stirring and conveying methods and/or devices while the quantity of polymers increases. Thus, the reaction space is charged with the gaseous ethylene in addition to the low quantities required of the stimulant, which directly results in a dry polyethylene powder as the reaction product which, except for the stimulant substances amounting to fractions of one percent, is not contaminated by any foreign matter.

When the ethylene polymerization was carried out in the conventional manner within an auxiliary liquid, it was easy to transfer the reaction heat evolved to cooling elements by means of the auxiliary liquid, and, moreover, to effect a temperature equalization, thereby avoiding detrimental increases in temperature.

It could not be predicted that it is also possible to carry out the polymerization of ethylene in the dry phase with the same good results without deleterious effects on the temperature-sensitive stimulants, due to local overheating, and without any sticking together of the material or formation of lumps occurring in spite of the heat of reaction being released while the material is simultaneously vigorously treated mechanically. Experiments have shown that, in accordance with the invention, the polymerization of ethylene may be effected trouble-free and with best utilization both of the gas and of the stimulants added.

The caking and sintering temperatures are to a certain extent dependent upon the degree of polymerization of the polyethylene. Thus, when working according to the invention the upper temperature limits may range the higher, the higher is the degree of polymerization. It was found that, with molecular weights of 100,000 and more, the upper temperature limits are at about 100–120° C. For example, good results have been obtained in the temperature range of 20–80° C.

The process of the invention may be carried out with any stimulant (catalyst) which, at pressures below 200 kg./sq. cm., effects a polymerization of ethylene. Suitable stimulants are preferably organic metal compounds, such as diethyl aluminum monochloride which is preferably used in mixture with titanium tetrachloride. The purity required of the ethylene-containing gases to be processed is largely dependent upon the type of stimulants used. If, for example, the polymerization of ethylene is effected with organometallic compounds, then the gases to be processed should not contain more than 0.02% of free or combined oxygen (water vapor, carbon dioxide, carbon monoxide) and acetylene as determined with phenyl isopropyl potassium and computed by oxygen content.

For the industrial performance of the process of the invention the mechanical or other physical treatment of the polymers already formed and loaded with stimulants is of prime importance. The granular or pulverulent material charged with polymerization stimulants may, during the action of the ethylene-containing gases, be motionless or more or less vigorously agitated while care has to be taken for sufficient cooling and continuous gas supply. These working conditions may be realized in widely different ways.

The reacting material may be supported by stationary or moved supports, or may be intermittently agitated on the same. For this purpose, e.g. conveyor belts may be used on which thin layers are maintained; or I may use vessels which are equipped with planetary stirrers in the manner of the known Eirich type mixers. It is also possible to use shelved furnaces in which the granular polymers loaded with stimulants and supported on cooled hearth surfaces are moved through a number of floors in downward direction by means of stirring devices. An agitation of the reacting material, which is sufficient for the process of the invention, may also be effected by means of rotary drums operating with or without spraying devices arranged therein.

The pulverulent or granular reaction mixture may also be subjected to a continuous moderate or vigorous agitation. This may, for example, be effected by kneading devices, screw conveyors, or stirrers which move in horizontal pipes or vertical vessels. During the conveying or kneading process, the granular or pulverulent reactants are continuously contacted, in an ever new manner, with the ethylene-containing gases. The granular constituents may simultaneously be passed on. The fine-grained polymerization products may also be allowed to slowly descend in tower-like containers, while small amounts of stimulants are sprayed at the top of the tower or are introduced into the reaction space in another manner in as fine as possible a distribution.

The process of the invention may also be accomplished by a process with eddy-formation. In this case, the granular polymerization products loaded with polymerization stimulants are maintained in a turbulent suspended state by the ethylene-containing gas stream. Into this eddy the small amount of stimulants required are simultaneously introduced. The granular polymerizates may also be placed into vibrating vessels, such as in vibration conveyor troughs, or vibration ball mills, where they are contacted with the gases being treated.

If desired, the motion of the granular polymer products already formed may take place at velocities which exceed the speed of fall. In this case, the treatment of the ethylene is preferably effected in free gas spaces. For example, centrifugal stirrers or turbo stirrers may be used for this purpose.

The polymers already formed and loaded with polymerization stimulants may also be whirled up in ethylene-containing gases and moved in this state through externally cooled reaction chambers, especially through reaction tubes. This operation is effected in the manner of the suspensoid process known for heterogeneous gas catalyses.

The execution of the process of the invention is not limited to the embodiments described above; it is also possible to operate with different forms of distribution between the granular polymerization products already formed and ethylene-containing gases.

The process of the invention may be accomplished in batches or continuously by means of the above-mentioned or other mechanical treating methods, known per se, which assure good distribution between the ethylene-containing gases and the pulverulent ethylene polymers already formed. The gaseous constituents may be conducted co-currently with or countercurrently to the solid reactants. The process may be operated in a single stage or in several successive stages. Different reaction conditions, i.e. temperatures, gas concentrations, flow directions of the gas, and gas pressures, may be chosen for the individual stages.

With the one or other type of mechanical treatment of the mixture it may be of advantage to insert comminuting devices between the individual stages in order to counteract any enlargement of grains or formation of lumps.

Such a comminuting process may expediently be accompanied by a simultaneous transportation of the material to the next stage, for example by means of sharply acting centrifugal pumps or in another manner. Finally, a comminuting action on the material may also be exerted during the polymerization, for example by allowing balls of inert material to travel along with the reactant when the process is carried out in rotary drums.

The heat of the reaction may be absorbed by the circulating gas and/or be transferred to liquid-cooled surfaces, it being possible to cool the walls of the reaction spaces and/or stationary or movable inserts arranged therein, or the surfaces serving as support for the material. The use of measures as described above for the removal of the heat of reaction from the reacting mixture for the purpose of maintaining the most favorable temperature conditions, is a substantial part of the invention.

It is also possible to combine operating units of different kind by connecting the same in series. The treatment of the ethylene may, for example, be first and, if necessary or desired, for the most part be effected in a fluidized bed (with eddy formation) whereupon the polymerization is completed in a shelved furnace or a screw conveyor with a sufficiently long residence time and with a corresponding concentration gradient of the stimulants.

The size of the vessels through which the reaction mixture passes from the inlet opening for the ethylene-containing gases to the termination of the polymerization must be selected in accordance with the increase in volume of the solid polymerization products formed during the reaction. It is desirable to provide for a slightly larger increase in volume in the reaction vessels than corresponds to the actual increase in volume of the polymer product because the space-time yield decreases due to the increasing dilution of the catalyst and/or due to its deactivation. Deactivation of the catalyst may be caused by contamination of the ethylene-containing gases. Decreasing space-time yields may also be compensated by increasing the temperature and/or pressure.

The ethylene-containing gases may be recycled through one or several working stages. Normal pressure as well as elevated pressures of as high as 200 kg./sq. cm. may be used. Of particular advantage is the use of gas pressures ranging between 5 and 50 kg./sq. cm.

The introduction of the unused and undiluted stimulants into the process may be effected in various manners. The catalyst may, for example, be sprayed or whirled up in the gas or distributed in another manner, or the gas may be passed over the catalyst which is stationary or moved on a support thereby producing a mixture containing a high concentration of the stimulant, which mixture is then further handled in accordance with the invention. It may be of advantage to use dilute gas for the first action upon the catalyst such as a tail gas which is poor in ethylene.

If a dilution of the ethylene-containing reaction gases is desired, only such inert gases are suitable which, in addition to ethylene, do not contain unsaturated hydrocarbons or oxygen-containing compounds. Examples of suitable inert gases are nitrogen, argon, ethane, methane.

It is also possible to return a small part of the pulverulent polyethylene already produced in the process and to use it as a carrier for the freshly charged catalyst. Both of the components are intermixed for this purpose and then further treated in accordance with the invention.

It is also possible to start the polymerization in the liquid phase and, after the concentration of the stimulant has dropped to a certain value, to continue the processing in the dry phase. In this case, a separation of the excess auxiliary liquid may be effected between the two mentioned steps with the exclusion of air. This can be done by using, for example, closed drum filters, filter candles, centrifuges, or other devices. Thereby, a substantially dry powder is obtained for working in the dry phase.

One of the most important advantages of the ethylene polymerization in accordance with the invention consists in the possibility of making products poor in ash without great expense and without additional operational measures. The inorganic additions introduced into the process in the form of the stimulants are quantitatively contained in the reaction product after the completion of the polymerization. Their removal from the reaction product by subsequent purifications, e.g. by a treatment with acids and the like, is only possible with great difficulty or not at all, but in any case only with the use of additional process steps and with additional cost. As contrasted thereto, the polymerization according to the invention can, on principle, be carried on to as low a concentration of the stimulant as desired, provided that the ethylene used is of sufficient purity. In this case the last step of the polymerization can easily be effected under working conditions which are favorable for the formation of products poor in ash. This involves a sufficiently extensive and intensive distribution and whirling-up of the polymer products already formed, optimum conditions of temperature and pressure, high concentration of ethylene and sufficiently long reaction times. The use of such working conditions causes no difficulties from the technical point of view. Under these conditions the process of the invention is capable of yielding high molecular weight ethylene polymers which, for example, contain 0.2% or less of ash.

The invention will now be more fully described with reference to the accompanying drawings, but it should be understood that these are given by way of illustration and not of limitation and that many changes can be made in the details without departing from the spirit of the invention.

Figure 1:
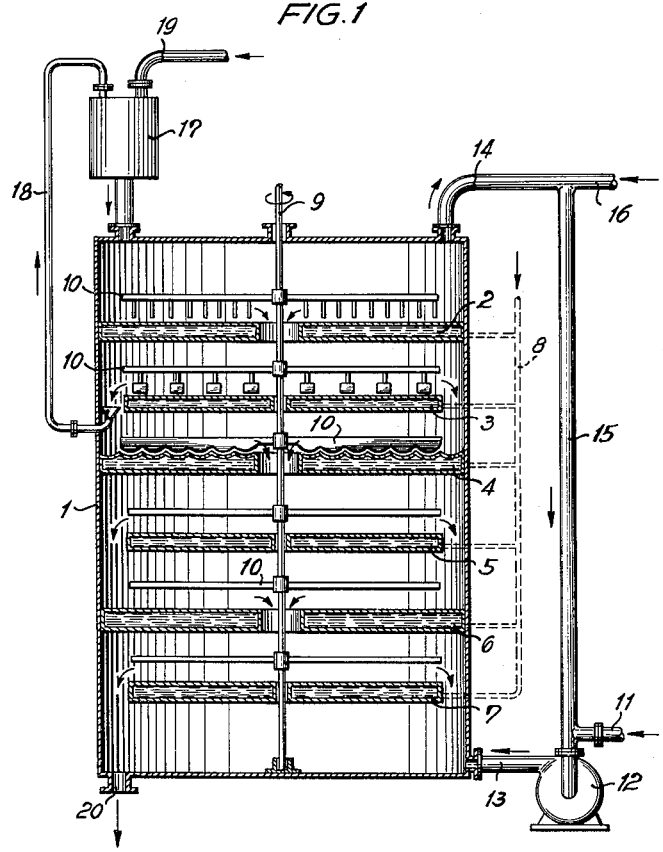
FIG. 1 is a vertical section through a multiple-story furnace.

Referring now to FIG. 1, a furnace 1 is shown having several superposed sections with bottoms 2–7 respectively. In the interior of the tray-shaped bottoms, there circulates a temperature-controlling medium such as cooling water, which is admitted through a line 8 and is drained off from the individual trays by suitable means in quantities corresponding to the progress of the reaction.

In vessel 1 a vertical shaft 9 is rotatably mounted, which is provided with arms 10 for stirring the contents of each tray. The stirrer arms 10 may be equipped with various stirring elements and support either vertical cogs, scrapers or other shaped bodies. By means of these stirring devices the granular materials are continuously turned over and agitated on their supports. On trays 2, 4, and 6 the material is simultaneously carried to the center, and on the trays 3, 5, and 7 it travels to the circumference. In the center or at the circumference of the trays, as the case may be, the material drops into the next lower section. With sufficient agitation the reaction mixture on the individual trays may be allowed to accumulate to layers of 10 to 20 centimeters in thickness.

The ethylene-containing gases are supplied through a line 11 and are introduced through line 13 at the bottom of the shelved furnace by means of a blower 12. Within the furnace the gases pass through the individual sections to the top, where they are sucked up by the action of blower 12 and returned into the cycle through lines 14 and 15. Quantities of tail gas, which are not to be returned into the process cycle, may be withdrawn through line 16.

Above the furnace 1, a mixing device 17 is arranged to which granular polymerizates are charged which are withdrawn from the tray 3 through a line 18. In mixer 17 the returned granular or pulverulent polymerizates are mixed with the stimulants which are supplied through a line 19 and are used for the treatment of ethylene.

The granular or pulverulent polymerizates which have been mixed with stimulants in the mixing device 17 are contacted with ethylene-containing gases on the trays 2 to 7. This results in the formation of additional quantities of polymers which, by means of the stirring device 9/10, travel downwardly on the individual trays. The finished product is discharged at the bottom of the furnace through an opening 20. By means of the medium used for temperature control the trays of the shelved furnace may be maintained at different temperature levels.

Figure 2:
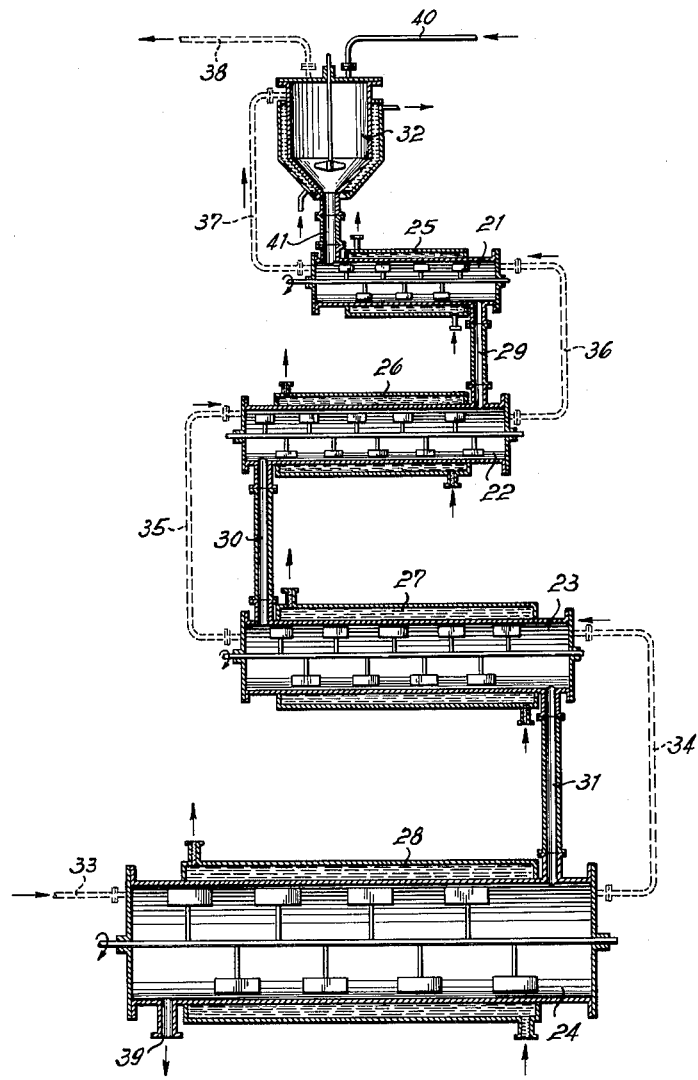
FIG. 2 illustrates a device for four-stage polymerization.

FIG. 2 shows a four-stage polymerization of ethylene to be effected with reaction vessels of increasing volume. Use is made of four horizontal cylindrical vessels 21, 22, 23, and 24 provided with horizontally rotating stirrers effecting an intensive agitation of the granular polymerization products present in the individual reaction vessels. The outside of the reaction vessels is surrounded by jackets 25, 26, 27, and 28 through which cooling media are flowing. In this manner each of the reaction vessels may be adjusted to the temperature required.

In view of the increase in volume of the forming polymers, the dimensions of the horizontal reaction vessels are made increasingly larger as clearly shown in FIG. 2. The horizontal stirrers are interconnected by means of down pipes 29, 30, and 31.

Above the uppermost stirrer 21 there is arranged a small vertical stirring vessel 32 which is likewise equipped with a cooling device.

The ethylene-containing gas to be treated is supplied to the last stirring vessel 24 through line 33. It flows through the individual reaction vessels by means of connecting lines 34, 35, 36, and 37 and escapes from the stirring vessel 32 through line 38 as tail gas. Thus, there exists a countercurrent flow relation between the granular polymerizates formed and the ethylene-containing gases throughout their travel. The finished polymerization products are withdrawn from the lowermost stirring vessel 24 through opening 39.

To initiate the polymerization, the required quantities of the polymerization stimulant are sprayed via line 40 into the vertical stirring vessel 32. Within the ethylene-containing gas atmosphere the finely divided stimulant forms granular polymers which contain a relatively large amount of stimulant. These polymer products are passed through line 41 to the reaction vessel 21. Here, and in the following vessels, the ethylene polymerization takes place in accordance with the invention.

The device shown in FIG. 2 may be operated at any desired gas pressure. The individual horizontal reaction vessels may also be operated at different gas pressure by using reducing valves or devices which increase the pressure.

Figure 3:
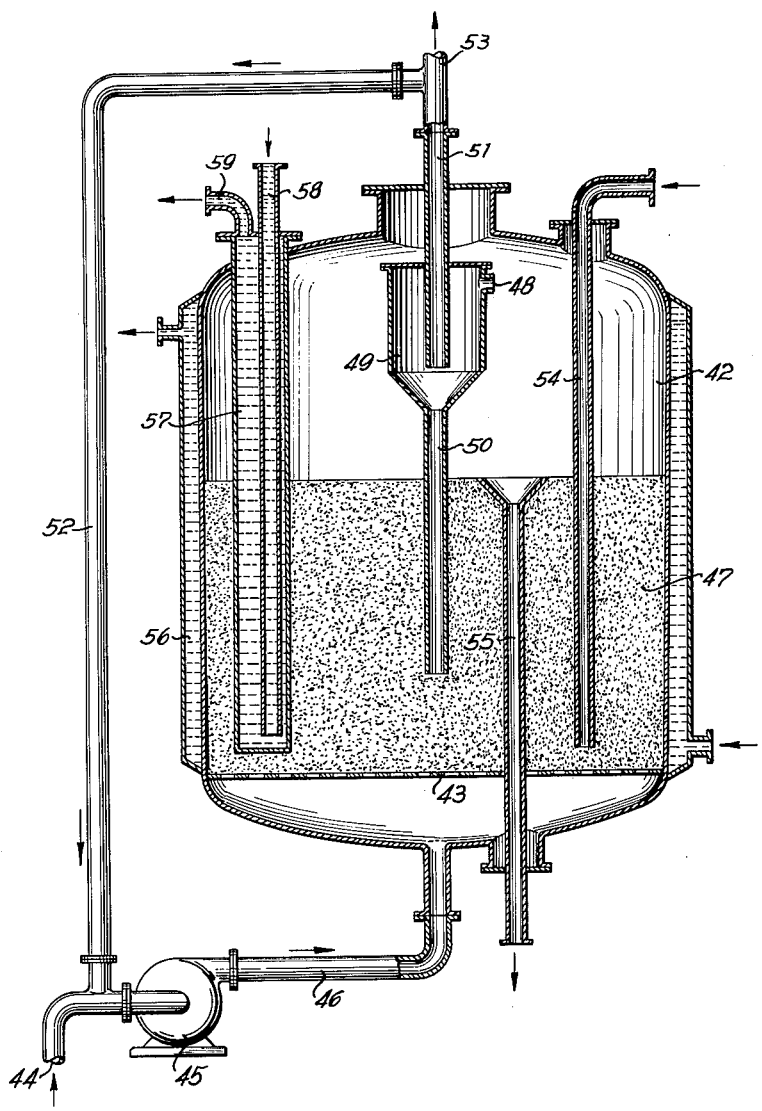
FIG. 3 is a one-stage polymerization vessel with piping equipment, partly in section.

FIG. 3 illustrates the execution of the ethylene polymerization, according to the invention, in a single-stage fluidized bed.

In the lower part of a closed pressure-resistant container 42 a screen 43 is installed as intermediate tray which supports the pulverulent mixture of stimulants and already formed ethylene polymerizates. The gas to be processed is supplied at 44 and, by means of blower 45, forced through line 46 and introduced into the apparatus below the screen surfaces 43. The flow rate of the gas and the gas pressure are adjusted so as to have the granular polymerizates form a turbulent suspended bed 47 above the screen surfaces 43. The gases rising from the fluidized bed pass through opening 48 into a separator 49 where entrained portions of polymerizate are separated. The granular portions are returned through a pipe 50 into the fluidized bed 47. The gases freed from solid constituents leave the container 42 through line 51. By means of line 52 they are sucked up by the blower 45 and again forced into the fluidized bed 47. Those quantities of gas which are no longer to remain in the reaction cycle may be removed through line 53.

The stimulant used for the polymerization of ethylene is introduced through a line 54 which extends almost to the bottom of the fluidized bed 47. Here, it mixes with the turbulent fine-grained or dustlike ethylene polymerizates and gives the incoming ethylene constantly new possibilities to polymerize. The finished polymerization products are continuously withdrawn from the surface of the fluidized bed 47 through line 55 and removed from the apparatus as end product.

For the removal of the heat of polymerization produced the container 42 is surrounded by a jacket 56 through which a suitable cooling medium flows. Moreover, cooling elements 57 may be inserted into the fluidized bed. These cooling elements are mounted in gas-tight connection at the cover of the container 42 and a cooling medium may flow through them by means of lines 58 and 59.

When operating with the fluidized apparatus shown in FIG. 3, the concentration of the stimulant used may be maintained, for example, at 0.5% or less of the solid materials present in the fluidized bed. In this manner I obtain ethylene polymers with so low a content of inorganic components that a further purification is no longer required for some uses.

Figure 4:
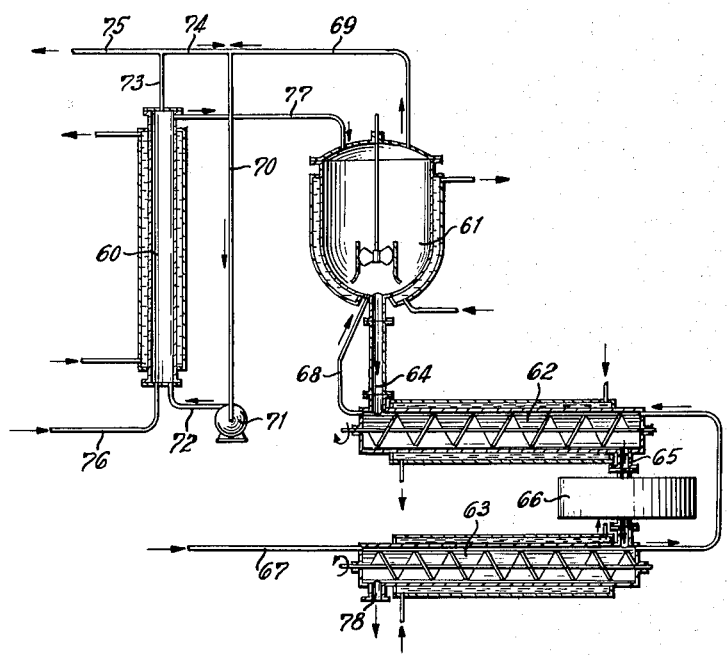
FIG. 4 is a view of a different embodiment of a polymerization plant.

FIG. 4 illustrates a plant for carrying out an embodiment of the process of the invention, in which the reaction is started with polymerizates which have been produced with the use of an auxiliary liquid.

The equipment used in this case comprises a vertical tube 60, a container 61 with stirrer, and two horizontal reaction vessels 62 and 63 connected in series and provided with screw conveyors. All of the reaction vessels are provided with jackets through which cooling media flow for removing the heat of the reaction.

The polymerizates drop from the vertical stirring vessel 61 through a pipe 64 into the horizontal screw conveyor 62 and thence through a vertical pipe 65 into the last reaction vessel 63. Between the reaction vessels 62 and 63 a comminution device 66 is inserted by means of which caked portions of the formed polymers are crushed.

The fresh ethylene gas flows through line 67 first into the last reaction vessel 63 and thence into the upper screw conveyor 62. Thereafter, the gas is passed through line 68 into the stirring vessel 61. From here, the gas passes through lines 69 and 70 into a circulation pump 71 by means of which it is forced through line 72 into the vertical reaction vessel 60. At the top of the vessel 60 the gas is carried off through line 73 and returned line 74 into the cycle. Quantities of gas which are no longer to be used may be removed through line 75.

The catalyst, mixed with an auxiliary liquid, is admitted through line 76. In reaction tube 60 it is contacted with the circulating tail gas and forms pulverulent polymerizates which, together with the auxiliary liquid, are transferred through line 77 into the reaction vessel 61. There, additional polymers are formed, while being constantly stirred, which at first are of pasty consistency. The pasty reaction mass, at the bottom of the stirring vessel 61, is transferred through line 64 into the horizontal reaction vessel 62 where, by further action of ethylene, a dry, pulverulent mass is gradually formed which is moved on and finally treated in the reaction vessel 63. A high molecular ethylene polymer is continuously withdrawn as the finished product from reaction vessel 63 through opening 78.

*Example*

A kneading machine (system Werner-Pfleiderer) filled with nitrogen and having a width of 22 cm., a length of 24 cm., and a height of 20 cm. (inside dimensions) was charged with 200 grams of pulverulent polyethylene which had been taken from a previous similar batch. To displace adhering air, the polyethylene, prior to being charged, was several times heated to 80° C. in nitrogen and subsequently evacuated. After having charged the polyethylene, the kneading machine was rinsed with nitrogen and then completely filled with the same. The kneading machine was maintained at 60° C. by means of a heating jacket through which water was flowing.

The polymerization stimulant (catalyst) used was a mixture of 60 grams of a hydrogenated $C_9$–$C_{11}$ hydrocarbon fraction, 5 gms. of diethyl aluminum chloride, and 0.8 gm. of titanium tetrachloride. The polymerization stimulant was uniformly distributed on the pulverulent polyethylene present in the kneading machine by spraying.

Thereafter, a gas comprising 97% of $C_2H_4$ and 3% by volume of $C_2H_6$ was introduced under normal atmospheric pressure. The disturbing contaminants ($H_2O$, $CO_2$, $CO$, $O_2$ and $C_2H_2$) had previously been determined by means of phenyl-isopropyl potassium. Calculated as oxygen, the impurities amounted to 0.004% $O_2$. The gas flowed continuously to the surface of the pulverulent polyethylene agitated in the kneading machine.

At the beginning of the conversion, 50 normal liters/hr. of gas and thereafter 200 normal liters/hr. of gas were introduced. On the average, only 5% of the ethylene-containing gases left the apparatus as tail gas. About 95% of the ethylene introduced was converted into pulverulent polyethylene which retained the pulverulent state for the whole duration of the batch operation. Its estimated molecular weight, as determined by known methods, was about 500,000. New polyethylene in amount of 1450 grams was obtained by means of the polymerization stimulant charged.

Where in the following claims the expression "agitating means" is used, this should be understood to comprise rotary drums, with or without inserts, planetary stirrers, e.g. of the Eirich type, tubes with stirring arms, centrifugal stirrers, kneading devices, screw conveyors which agitate the goods, vibration conveyor throughs, vibration ball mills or other vessels performing vibratory motions, turbo stirrers, and means equivalent thereto.

What I claim is:

1. A process for the production of polyethylene having molecular weights ranging from 100,000 to 500,000 from ethylene and ethylene-containing gases in a reaction vessel, which comprises charging said vessel with powdered polyethylene, previously formed, spraying thereon a catalyst consisting of a mixture of diethyl aluminum chloride with titanium tetrachloride dispersed in a hydrogenated $C_9$–$C_{11}$ hydrocarbon fraction, and introducing a gas containing at least 97 percent ethylene, maintaining said reaction vessel at a pressure below 200 kg./cm.$^2$ and at a temperature of 10 to 120° C. depending upon the molecular weight of the polyethylene to be attained, and providing mechanical agitation, whereby approximately 95 percent of said ethylene are converted into polyethylene.

2. The process set forth in claim 1, wherein the ethylene-containing gases are treated at temperatures of 20–90° C., depending upon the degree of polymerization of the materials to be produced.

3. The process set forth in claim 1, wherein the treatment of the ethylene-containing gases is effected in several successive stages.

4. The process set forth in claim 3, wherein the temperatures are increased with the succeeding process steps.

5. The process set forth in claim 3, wherein the polymerization products are comminuted between the individual steps of the treatment.

6. The process set forth in claim 1, wherein the mixture of catalysts and polymer formed is subjected to leastwise intermittent agitation.

7. The process set forth in claim 1, wherein the conversion is started within a mixture of previously formed polymers and catalysts, and said mixture is agitated at velocities ranging between moderate speed and motion exceeding the speed of fall.

8. The process set forth in claim 7, wherein the ethylene-containing gases and the reaction mixture of polymers formed and catalysts are agitated in countercurrent.

9. The process set forth in claim 1, wherein conversion is effected within a mixture of solid small-particle-sized polymers previously formed and polymerization catalysts, the latter being dispersed in small amounts of an inert auxiliary liquid.

10. The process set forth in claim 1, wherein the heat of reaction, developed during conversion, is absorbed by the circulating gas used in the conversion.

11. A process for the production of solid polyethylene which comprises charging a reaction vessel with a previously formed, finely divided polyethylene, contacting said preformed polymer with a catalyst consisting essentially of a mixture of diethyl-aluminum chloride and titanium tetrachloride, dispersed in an inert diluent, subsequently introducing gaseous ethylene and maintaining said reaction vessel under polymerization conditions.

(References on following page)

References Cited by the Examiner

UNITED STATES PATENTS

| | | | |
|---|---|---|---|
| 2,240,618 | 5/1941 | Harris | 23—285 |
| 2,378,138 | 6/1945 | Gaylor | 23—285 |
| 2,384,298 | 9/1945 | Green | 23—260 |
| 2,388,138 | 10/1945 | Greenewalt | 260—94.9 |
| 2,405,962 | 8/1946 | Larson | 260—94.9 |
| 2,557,910 | 6/1951 | Green | 23—260 |
| 2,769,804 | 11/1956 | Hanson | 260—86.7 |
| 2,788,340 | 4/1957 | Dannels | 260—94.9 |

FOREIGN PATENTS

| | | |
|---|---|---|
| 533,362 | 5/1955 | Belgium. |
| 584,794 | 1/1947 | Great Britain. |

JOSEPH L. SCHOFER, *Primary Examiner.*

W. G. BENGEL, A. M. BOETTCHER, B. E. LANHAM, L. H. GASTON, *Examiners.*